(12) United States Patent
Pizzi et al.

(10) Patent No.: US 9,302,413 B2
(45) Date of Patent: Apr. 5, 2016

(54) COMPOSITION FOR MANUFACTURING A TANNIN-BASED FOAM MATERIAL, FOAM MATERIAL OBTAINABLE FROM IT, AND MANUFACTURING PROCESS THEREOF

(75) Inventors: Antonio Pizzi, Chantraine (FR); Maria Cecilia Basso, Epinal (FR); Alain Celzard, Epinal (FR); Vanessa Fierro, Epinal (FR); Samuele Giovando, Monforte d' Alba (IT)

(73) Assignees: SILVACHIMICA S.R.L. (IT); UNIVERSITE DE LORRAINE (FR)

( * ) Notice: Subject to any disclaimer, the term of this patent is extended or adjusted under 35 U.S.C. 154(b) by 106 days.

(21) Appl. No.: 14/234,094

(22) PCT Filed: Jul. 18, 2012

(86) PCT No.: PCT/EP2012/003031
§ 371 (c)(1),
(2), (4) Date: Jan. 21, 2014

(87) PCT Pub. No.: WO2013/010668
PCT Pub. Date: Jan. 24, 2013

(65) Prior Publication Data
US 2014/0158927 A1 Jun. 12, 2014

(30) Foreign Application Priority Data
Jul. 21, 2011 (IT) .............. TO2011A0656

(51) Int. Cl.
C08J 9/14 (2006.01)
B29C 44/02 (2006.01)

(52) U.S. Cl.
CPC ............... B29C 44/02 (2013.01); C08J 9/141 (2013.01); C08J 9/142 (2013.01); C08J 2371/14 (2013.01); C08J 2393/00 (2013.01)

(58) Field of Classification Search
CPC ........... B29C 44/02; C08J 9/141; C08J 9/142; C08J 2371/14; C08J 2393/00
See application file for complete search history.

(56) References Cited

U.S. PATENT DOCUMENTS

| 3,948,824 A | * | 4/1976 | Robins .................... 521/171 |
| 4,003,873 A | * | 1/1977 | Smith ..................... 524/6 |
| 2006/0084718 A1 | | 4/2006 | Stancliffe et al. ............. 523/139 |
| 2007/0299167 A1 | | 12/2007 | Chen et al. .................... 524/72 |

FOREIGN PATENT DOCUMENTS

DE 2625811 12/1976 .............. C08L 61/06

OTHER PUBLICATIONS

Link, Martin et al., Formaldehyde-Free Tannin-Based Foams and Their Use As Lightweight Panels, BioResources, Nov. 2011, pp. 4218-4228, vol. 6, No. 4.*
PCT International Search Report issued in corresponding application No. PCT/EP2012/003031, dated Oct. 22, 2012 (3 pgs).
Trosa et al., "Industrial hardboard and other panels binder from tannin/furfuryl alcohol in absence of formaldehyde," Holz als Roh- und Werkstoff, vol. 56, No. 3, 1998, pp. 213-214 (2 pgs).
Zhao et al., "Effect of composition and processing parameters on the characteristics of tannin-based rigid foams. Part I: Cell structure," Materials Chemistry and Physics, vol. 122, No. 1, Jul. 2010, pp. 175-182, abstract only (5 pgs).

* cited by examiner

*Primary Examiner* — Irina S Zemel
(74) *Attorney, Agent, or Firm* — Hayes Soloway P.C.

(57) ABSTRACT

A composition for manufacturing a foam material based on flavonoid tannins, includes a flavonoid tannin powder mainly of the prorobineditinidin and/or the profisetinidin type, according to an amount in weight in the range between 40% and 45% of the composition, furfuryl alcohol, a blowing agent, and a catalyst. The composition is totally formaldehyde-free, and contains an amount of furfuryl alcohol greater than 20% in weight of the composition. The composition makes possible to obtain foam materials of high characteristics and low cost, that can typically be used in the fields of building and in the automotive industry and in the vehicles in general.

20 Claims, 4 Drawing Sheets

Figure 1:
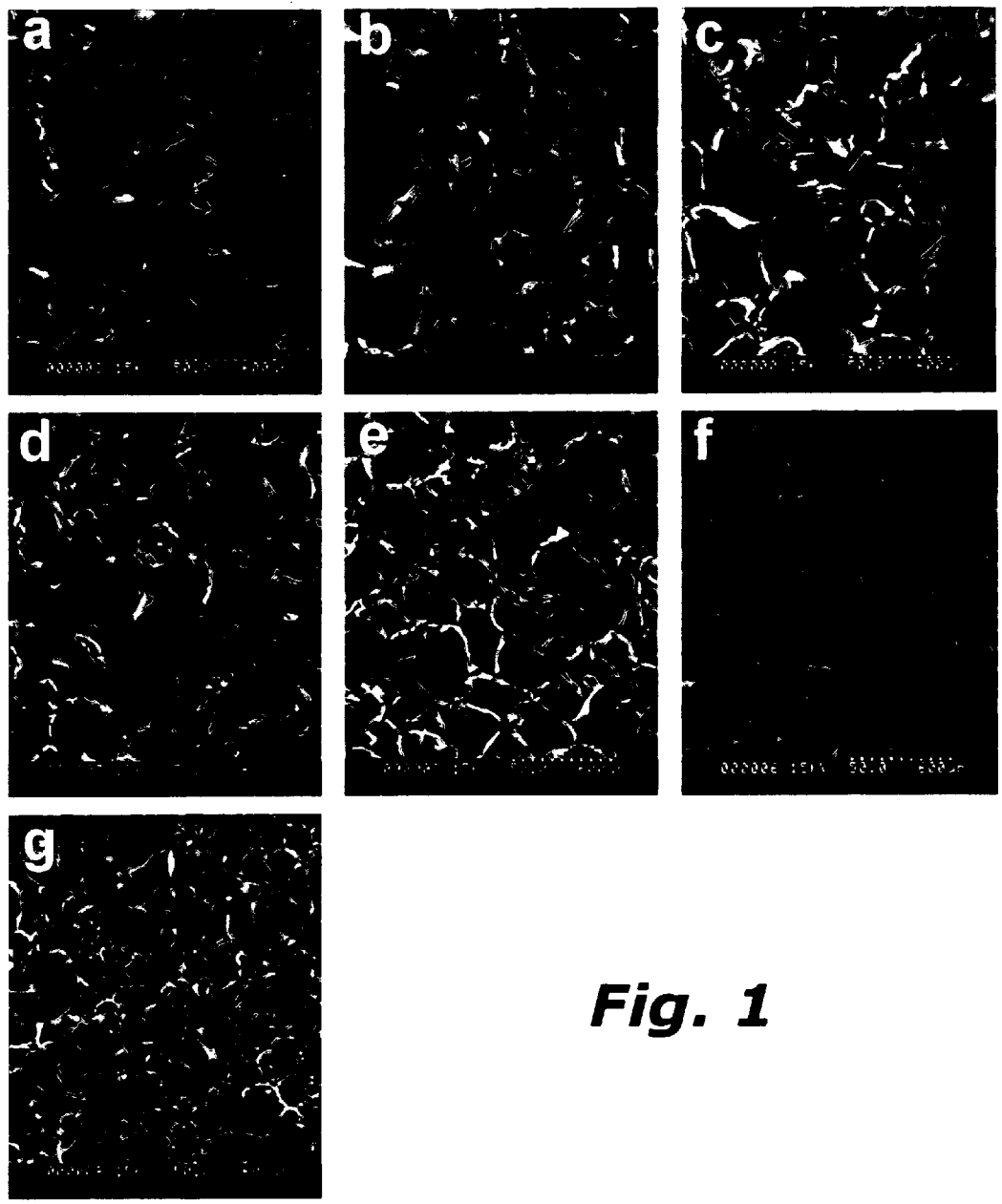

COMPOSITION FOR MANUFACTURING A TANNIN-BASED FOAM MATERIAL, FOAM MATERIAL OBTAINABLE FROM IT, AND MANUFACTURING PROCESS THEREOF

The present invention generally refers to foam materials adapted to be used in a wide range of applications and, typically, in the fields of building and in the automotive industry and in the vehicles in general.

Organic foam materials are known, used for a long time as insulating materials.

For example, polystyrene foam, polyurethane foam, mineral wool, cellulose wadding, wood-wool, hemp, and phenolic resin based foam materials are part of this category of materials.

However, polystyrene and polyurethane based foam materials, in spite of the fact that they have high thermal insulation properties, are very sensitive to fire and easily flammable, and they release very toxic gases during their combustion. However, phenolic foam materials, having better fire resistance properties, are more brittle and expensive.

Moreover, all these known foam materials have synthetic origin and contain chemical products deriving from petrochemical industry, and therefore are not renewable substances since their availability in nature is limited. Between these, wood-phenolic and tannin-resorcinol based foam materials are very brittle and comprise remarkable amounts of petrochemical compounds, therefore are not renewable and, after all, they are little eco-compatible.

In particular, the invention relates to a composition for manufacturing a tannin-based foam material, of the type defined in the preamble of claim 1.

Flavonoid tannin based foam materials are already known, which flavonoid tannins consist of small polyphenolic molecules, mainly water-soluble, extracted from several plant species.

In particular, the invention refers to compositions based on tannins of the prorobineditinidin and profisetinidin type, typically obtained from barks of mimosa (*Acacia mearnsii*) or acacia (*Acacia mangium*) trees, or from quebracho (*Schinopsis lorenzii* and/or *Schinopsis balansae*) wood, through a not polluting extraction process carried out by means of warm water with or without additives, or by organic solvents. In particular, flavonoids of tannins are natural occurring products so that they are renewable, available in nature in great amounts, and they are not petrochemical derivatives.

Formulations used up to now in order to obtain foam materials containing tannins, potentially contain also relatively meaningful formaldehyde amounts, that is a polluting, toxic and carcinogenic product.

In particular, a composition is already known, used for manufacturing tannin based foam materials, that comprises 44.2% in weight of tannin, 15.5% in weight of furfuryl alcohol (FA), 10.9% in weight of formaldehyde (Fo), 4.4% in weight of diethyl ether (DEE), and 16.2% in weight of p-toluenesulfonic acid (p-TSA). This known composition is reported in the following as standard (STD).

However, it has been confirmed that formaldehyde releases into the air substances that can cause irritations and inflammations of the skin, of the eyes and of respiratory tracts, as well as adverse neurological effects such as headache, vertigos and fatigue, and that can also promote development of allergies and childhood asthma. Therefore, formaldehyde has been classified as a "suspicious carcinogenic" element in the UE, and as "surely carcinogenic" for the CIRC (Center of International Research on the Cancer, under the authority of the OMS).

As a result of standards that will be in force in short term (PNSE2), it will be compulsory to identify emissions from products containing formaldehyde, used for example for thermal insulation.

It would be therefore advisable to obtain a foam material by a composition comprising as much as possible resources available in nature, therefore of the renewable type, in particular without any need to use petrochemical based substances, having moreover low thermal conductivity properties, high fire resistance, low cost, easy preparation, low friability and good water resistance, and at the same time lacking in formaldehyde.

In particular, the object of the invention is to provide a composition for manufacturing a tannin based foam material, having the above mentioned desired features.

This object is reached by a composition as defined in appended claims 1 to 10.

By virtue of the composition subject of the invention, in view of the fact that the composition according to the invention comprises essentially tannin, furfuryl alcohol, a blowing agent and a catalyst, and by virtue of the fact that the composition contains an amount of furfuryl alcohol of 20% in weight and lacks completely in formaldehyde, it is possible to obtain a foam material of ecological origin, non toxic and the 90% of which is based on resources available in a great amount in nature, non petrochemical based.

In fact, furfuryl alcohol is a naturally occurring product deriving from catalytic reduction of furfural, that is obtained as a residual from hydrolysis of sugars of agricultural harvests.

Moreover, the foam materials obtainable from this composition are extremely light, little expensive, easy to produce, and have characteristics of good mechanical strength, high fire resistance, high degree of infusibility, absolute non flammability, reduced thermal conductivity, and therefore good properties of thermal insulation, as well as of water resistance, compressive strength, and a better flexibility than that of the foam materials known up to now.

These characteristics makes extremely interesting for its use the foam material obtainable from the composition of the invention, in particular in the field of building materials, in the automotive industry and in the industry of vehicles in general.

Moreover, the subject of the invention is a foam material obtainable from said composition, such as defined in claim 11, as well as a process for manufacturing such foam material, as defined in claims 12 to 15.

Figure 2:
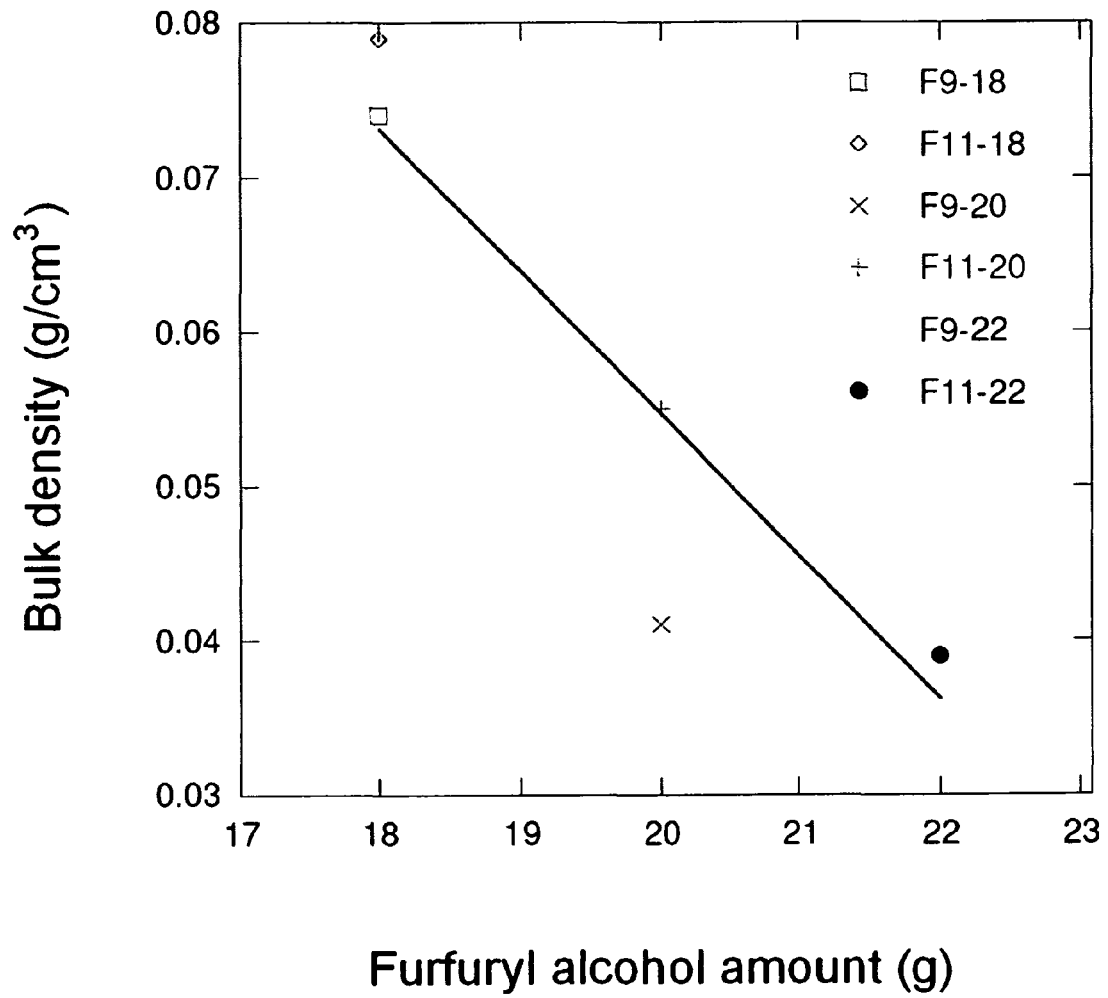
Figure 3:
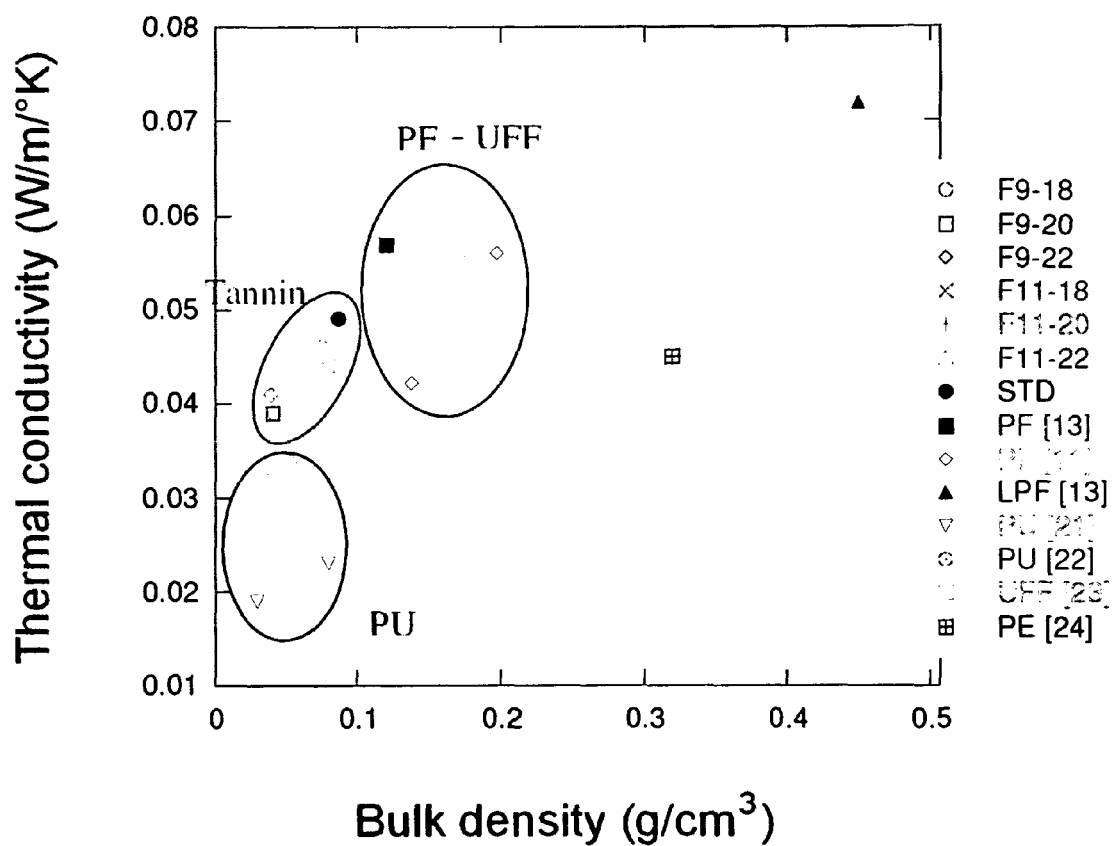
Figure 4:
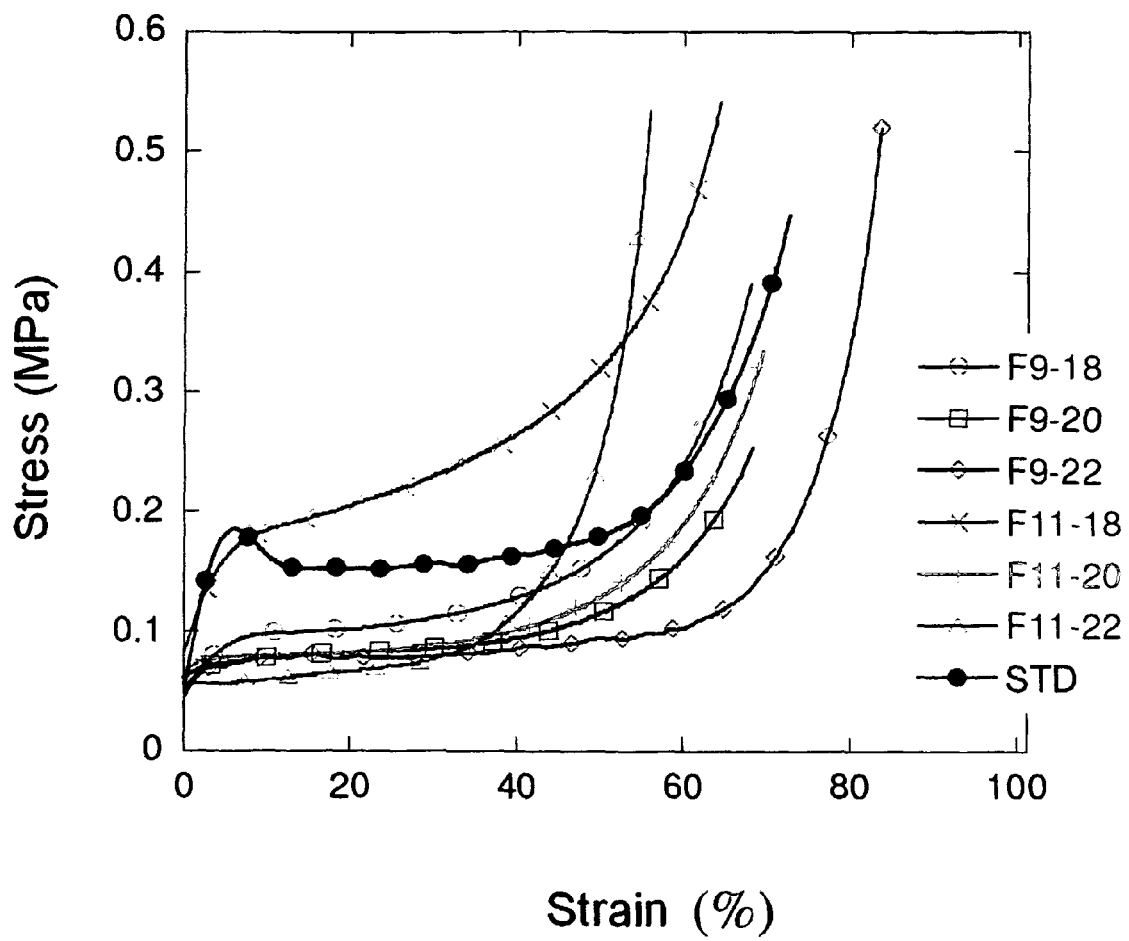

Further characteristics and advantages of the invention will be clarified by the following detailed description, provided as a non limitative example and referred to the appended drawings in which:

FIG. 1 comprises a series of electron microscope images a) to f) the for sections of samples of foam materials obtained starting from a composition according to the invention, as well as an image g) of a sample of a foam material obtained starting from a standard formulation according to the prior art, FIG. 2 is a diagram showing the bulk density of a series of foam materials according to the invention comprising 30 g of tannin, as a function of the respective amount of furfuryl alcohol, FIG. 3 is a diagram showing the thermal conductivity of a series of samples of foam material obtained from the composition of the invention, and of several foam materials known in the art, as a function of the respective bulk density, and FIG. 4 is a diagram showing the characteristic stress/strain curves obtained for a series of samples of foam materials according to the invention, and for a foam material obtained starting from a standard formulation of the prior art.

GENERAL DESCRIPTION OF THE COMPOSITION

A foam material according to the invention is obtained starting from a composition that mainly includes flavonoid tannin of the prorobineditinidin and/or profisetinidin type in the form of a powder, furfuryl alcohol (2-furylmethanol or 2-furancarbinol), a blowing agent, and a catalyst.

The tannin powder is used according to an amount in weight in the range between 40% and 45%.

The furfuryl alcohol is used according to an amount in weight greater than 20%, with the aim of replacing formaldehyde used in the known compositions, in order to avoid at all any use of formaldehyde in the composition of the invention and in the respective foam material.

As the blowing agent a liquid is used, the boiling point of which is between 30° C. and 100° C., ideally between about 40° C. and 60° C., conveniently based on ethyl ether, pentane, and/or a mixture of isomers of pentane, and preferably consisting, in the following non limitative example, of diethyl ether.

The catalyst is of the acid, organic or inorganic, based type, and preferably consists of p-toluenesulfonic acid (p-TSA) or, as an alternative, trichloroacetic acid.

Water can also be used according to an amount in weight between 0% and 15% of the composition, for example between 8% and 9%.

Moreover, an isocyanate can be added to the composition, such as PMDI (polymeric diphenylmethane diisocyanate) with the aim of increasing mechanical strength of the foam material to be obtained.

In particular, the amount of blowing agent (for example diethyl ether) in the composition is greater than 5% in weight, and the catalyst amount (for example p-toluenesulfonic acid—p-TSA) is smaller than 16% in weight.

The aforesaid composition allows a foam material with high characteristics to be obtained, such as explained in more detail in the following, as a result of a process for manufacturing the foam material in a mould the shape of which corresponds to that of the material to be obtained.

EXAMPLES

Hereinafter, examples are described, for merely illustrative and non limitative purposes, of compositions that can be used for manufacturing a tannin based foam material according to the invention, as well as the relevant manufacturing process, with particular reference to the following tables 1 and 2.

In table 1, the amounts in weight in grams of the components usable to prepare a series of samples of the new foam material, are shown.

These samples are indicated in general as Fx-y, where x and y are the amounts of the catalyst (p-TSA) and of the furfuryl alcohol (FA), respectively. Fo and DEE indicate the amounts of formaldehyde and diethyl ether, respectively. In the Table 1, for comparison, the standard composition (STD) of the known foam material is also mentioned.

TABLE 1

| SAMPLE | F9-18 | F9-20 | F9-22 | F11-18 | F11-20 | F11-22 | STD |
| --- | --- | --- | --- | --- | --- | --- | --- |
| p-TSA (g) | 9 | 9 | 9 | 11 | 11 | 11 | 11 |
| FA (g) | 18 | 20 | 22 | 18 | 20 | 22 | 10.5 |
| Fo (g) | 0 | 0 | 0 | 0 | 0 | 0 | 7.4 |
| DEE (g) | 5 | 5 | 5 | 5 | 5 | 5 | 3 |
| Water (g) | 6 | 6 | 6 | 6 | 6 | 6 | 6 |
| Tannin (g) | 30 | 30 | 30 | 30 | 30 | 30 | 30 |

The tannin based foam material lacking in formaldehyde according to the invention has been prepared as follows.

Initially, furfuryl alcohol (FA: from 18 to 22 g), diethyl ether (DEE—blowing agent: 5 g) and preferably water (6 g), are stirred together. Then, 30 g of tannin powder are progressively incorporated, by strongly stirring the mass during about 15 s, for example using a helical stirrer of a type known per se.

Finally, 9 to 11 g of catalyst, for example an organic acid, typically consisting of p-toluenesulfonic (p-TSA), is added by stirring during about 20 s, and the mixture is poured in a mould the shape of which corresponds to that of the foam material intended to be obtained.

After a variable waiting time, of the order of some minutes, the catalyst starts auto-polymerization of the furfuryl alcohol with the tannin. This reaction, which is exothermic, generates heat and causes the blowing agent (DEE) to boil, which causes the beginning of the expansion step of the mixture in the mould. As an alternative, the heat necessary to the expansion of the composition can be supplied, also just in part, from an outer heat source.

Expansion takes place after a waiting time of some minutes, and it allows the mould to be filled in the best manner, until the foam material takes a shape corresponding to that defined by the mould. In this manner, it is possible to obtain a shape of the foam material of any geometry and volume.

In the following Table 2, the compositions of the same samples mentioned in the Table 1, including the standard composition comprising formaldehyde, are provided, that are referred to the percentages in weight of their components.

TABLE 2

| SAMPLE | F9-18 | F9-20 | F9-22 | F11-18 | F11-20 | F11-22 | STD |
| --- | --- | --- | --- | --- | --- | --- | --- |
| p-TSA (%) | 13.2 | 12.9 | 12.5 | 15.7 | 15.3 | 14.9 | 16.2 |
| FA (%) | 26.5 | 28.6 | 30.6 | 25.7 | 27.8 | 29.7 | 15.5 |
| Fo (%) | — | — | — | — | — | — | 10.9 |
| DEE (%) | 7.4 | 7.1 | 6.9 | 7.1 | 6.9 | 6.8 | 4.4 |
| Water (%) | 8.8 | 8.6 | 8.3 | 8.6 | 8.3 | 8.1 | 8.8 |
| Tannin (%) | 44.1 | 42.9 | 41.7 | 42.9 | 41.7 | 40.5 | 44.2 |
| TOTAL | 100% | 100% | 100% | 100% | 100% | 100% | 100% |

With reference to the amounts of Table 2, in a first step of the manufacturing process of the foam material, the furfuryl alcohol, according to an amount in weight greater than 20%, and the blowing agent, typically diethyl ether according to an amount in weight greater than 5%, are stirred together.

Preferably, water according to an amount in weight between about 8% and 9% of the final composition, is added to the mixture so obtained.

The tannin powder is then incorporated in the mixture so obtained, according to an amount between 40% and 45% in weight, and the mixture is stirred again.

Then, an acid based catalyst, typically p-toluenesulfonic acid (p-TSA) or, as an alternative, trichloroacetic acid, is added according to an amount in weight smaller than 16%, and stirred with the mixture.

An isocyanate can also be added to the mixture, such as PMDI, for example according to an amount variable between 5% and 20% in weight of the composition.

The mixture so obtained is poured into the mould, where the expansion thereof takes place, such as like previously described.

In particular, the formulation of the composition is optimized in order to prevent a too fast hardening of the foam material, and in order to avoid or minimize formation of porosities in the material, and also so that the material can not endure any sag or collapse as a result of a too long hardening step. In particular, by virtue of the appropriate balance between expansion and hardening of the foam material, it neither collapse nor breaks.

The same process was used to prepare the standard tannin based foam material (STD) containing formaldehyde, in order to compare the materials according to the invention and the material of the standard composition, as reported in the following.

Examination of the Samples Obtained

All the samples of the foam materials obtained as described above, were cut in the shape of parallelepipeds, and were weighted in order to measure their bulk density.

All the samples proven to be homogenous and lacking in defects.

The small samples obtained were then metalized with gold, and examined by a Hitachi S 520 scansion electron microscope (SEM).

Their thermal conductivity was measured at room temperature with the TPS (transient plane source—Hot Disk TPS 2500) method, and also the measure of their compressive strength was carried out, by an Instron 4206 universal test machine having a load ratio of 2.0 mm/min.

FIG. 1 shows the images obtained by the SEM with 50× magnification, for sections of the samples mentioned above, particularly in connection with the compositions F9-18 (a), F9-(b), F9-22 (c), F11-18 (d), F11-20 (e) and F11-22 (f) as mentioned in Tables 1 and 2, as well as for a section of the sample with the standard formulation containing formaldehyde (g) according to the prior art.

Structure of the Samples Obtained

As it can be noticed from the images of FIG. 1, the structure of the most of the foam materials obtained shows closed and opened cells, spaced by thin membranes from the near cells. In some zones, the membranes are broken, particularly in the case of higher amount of furfuryl alcohol, such as in the case of the samples (b), (c), (d) and (f).

As a result of a greater amount of p-TSA in the formulation (samples (d), (e), (f)) the structure of the foam material has relatively smaller cells, even if such effect is of small entity.

On the other hand, high amounts of furfuryl alcohol (FA) does not involve a clear effect on the average dimension of the cells, but they cause a meaningfully reduction in the bulk density of the relevant material. At any rate, it is preferable to use amounts of furfuryl alcohol only within a narrow range (from 18 to 22 g, with reference to Table 1), otherwise the foam material is little stable and little homogenous.

FIG. 2 shows the bulk density ($g/cm^3$) of the samples of the foam material according to the invention, that is in connection with the compositions F9-18, F9-20, F9-22, F11-18, F11-20 and F11-22, as a function of the amount in weight of furfuryl alcohol used in the relevant compositions, and referred to samples of foam material containing 30 g of tannin.

As it can be noticed from FIG. 2, by increasing the amount of furfuryl alcohol, the bulk density of the respective foam material is reduced, and therefore, in other words, the material is "more expanded". In fact, a higher amount of furfuryl alcohol causes a more exothermic reaction, which serves as the basis for the growth of the relevant foam material. Therefore, less catalyst can be used (9 g rather than 11 g) without appreciably modifying the structure of the foam material. The tannin absorbs a part of the heat, which makes the foam material homogenous and causes a rather slow growth of it.

Properties of the Foam Materials of the Invention

In general, it has been found that, with the composition of the present invention and in comparison with the standard composition of the prior art, the substitution of formaldehyde by greater amounts both of furfuryl alcohol or the blowing agent, allows a foam material to be obtained the characteristics of which are generally better than those obtainable by the standard compositions, and that, at any rate, allows any use of formaldehyde to be avoided.

In FIG. 3, thermal conductivities (W/m/° K) of the tannin based foam materials according to the invention are shown, as a function of the relative bulk density ($g/cm^3$), in comparison with thermal conductivities of other foam materials known in the art, in particular of phenolic (PF), urea-formaldehyde-furfuryl (UFF) alcohol based, polyurethane (PU) based, phenolic wood (LPF) based and polyethylene (PE) based foam materials.

It can be noticed that the materials of the present invention have a lower thermal conductivity in view of a low bulk density, and therefore their thermal insulation characteristics are fully comparable with those of the polyurethane (PU) based foam materials, and are better than those of the phenolic (PF), Or alcohol urea-formaldehyde-furfuryl (UFF) based foam materials. It must be taken into account that, however, PU based foam materials are more fire sensitive and they release highly toxic compounds during their combustion.

In the case of the materials according to the invention, their non flammability characteristic, owing to the presence of furfuryl alcohol and tannin, makes them more favourable with respect to PU based materials.

In particular, between the tannin based foam materials, the thermal conductivity of those according to the present invention is lower than that of the standard (STD) composition containing formaldehyde, and therefore they are proven to be better from a thermal insulation point of view.

In FIG. 4, the stress/compressive strain characteristics of the tannin based materials according to the invention are shown, in particular obtained for the foam material samples of the compositions F9-18, F9-20, F9-22, F11-18, F11-20 and F11-22, in comparison with the characteristics of the sample of the standard (STD) foam material containing formaldehyde.

The curves of FIG. 4 show the typical shape expected from solids provided with a cellular structure, similar to that obtainable for the standard formulation containing formaldehyde. In particular, the stress/strain curves have three clearly recognizable zones: an initial zone of linear elastic response, a substantially flat intermediate zone or "plateau", and a final "densification" zone. The most of the foam materials according to the invention have a good elastic behavior, and therefore a smaller rigidity, with respect to the standard (STD) material, except for the composition F11-18. Consequently, foam materials obtained from compositions F9-18, F9-20, F9-22, F11-20 and F11-22, are less brittle than the standard (STD) material containing formaldehyde, and therefore they do not break easily. Moreover, their module of elasticity is meaningfully smaller. This involves a meaningful improvement with respect to the previously known tannin and formaldehyde based formulation.

This behavior is owed to the fact that formaldehyde easily immobilizes tannin molecules during cross-linking, and therefore it strongly reduces mobility of such molecules, which causes an incomplete polymerization and the formation of a brittle polymeric lattice of the vitreous type. Therefore, absence of formaldehyde in the compositions of the present invention allows a much higher flexibility to be obtained in the polymer chains of the relevant foam materials.

Usually, foam materials are classified as rigid, partially rigid or flexible, on the basis of their compressive strength: >0.08 MPa, 0.015÷0.08 MPa and <0.015 MPa, respectively.

The foam materials of the F9-18, F9-20, F9-22, F11-18 and F11-20 type according to the invention are essentially rigid, while the material of the F11-22 type, having the lower bulk density (FIG. 2), is actually soft. Since the material F11-22 is also that showing the smallest thermal conductivity, of about 0.038 W/m/° K (FIG. 3), it is particularly interesting because it combines a relevant lightness and very good insulation qualities besides its natural origin, with fire-proof and low cost properties.

Moreover, the foam materials of the invention are considerably less hydrophilic than the similar materials containing formaldehyde, and they have a very low wettability. In fact, a water drop placed on their surface requires a very long time, in the order of 5÷10 minutes, to be slowly soaked since, owing to porosity of the material, water is gradually dispersed in it.

Instead, in the previously known standard formulation, water is soaked in a very fast manner, and the water amount that can be soaked by the dry foam material, may reach up to seven times its initial weight.

In conclusion, a tannin based foam material according to the invention can be obtained as a result of a "more ecological" preparation, without any use of formaldehyde.

The materials according to the invention, compared with the first generation of tannin based foam materials containing formaldehyde, have in general a lower bulk density, a lower reduced thermal conductivity that makes them adapted to be used as thermal insulating materials, and a lower hydrophily. Also, they are much less brittle than the similar materials containing formaldehyde, and they have a higher flexibility and a low friability, as well as good characteristics of mechanical strength. Moreover they do not burn and are auto-extinguishing and, if subject to a high amount of heat, consumes slowly.

The invention claimed is:

1. A composition for manufacturing a foam material based on a prorobineditinidin tannin and/or a profisetinidin tannin comprising between 40% and 45% by weight of the composition of the tannin, furfuryl alcohol, a blowing agent, and a catalyst,
wherein the composition contains an amount of furfuryl alcohol greater than 20% in weight of the composition, and in that the composition is totally formaldehyde-free.

2. The composition according to claim 1, wherein said blowing agent has a boiling point between 30° C. and 100° C.

3. The composition according to claim 2, wherein said blowing agent is based on ethylether, pentane, and/or a mixture of pentane isomers.

4. The composition according to claim 3, wherein said blowing agent is diethyl ether.

5. The composition according to claim 1, wherein said catalyst is based on an acid, of the organic or of the inorganic type.

6. The composition according to claim 5, wherein said catalyst is p-toluensulfonic acid (p-TSA).

7. The composition according to claim 5, wherein said catalyst is trichloroacetic acid.

8. The composition according to claim 1, wherein the composition contains an amount of blowing agent greater than 5% in weight, and an amount of catalyst smaller than 16% in weight of the composition.

9. The composition according to claim 1, wherein the composition contains up to 15% in weight of water.

10. The composition according to claim 8, wherein the composition also contains an isocyanate.

11. The composition according to claim 2, wherein said blowing agent has a boiling point between 40° C. and 60° C.

12. The composition according to claim 10, wherein the isocyanate comprises a polymeric isocyanate (PMDI).

13. A process for manufacturing a product of organic foam material usable as a thermal insulator, said process comprising the steps of:
providing a mould having a shape which corresponds to that of the product to be obtained,
providing furfuryl alcohol and a blowing agent having a boiling point in the range between 30° C. and 100° C., and mixing together such components,
providing a flavonoid tannin powder, comprising a prorobineditinidin tannin and/or a profisetinidin tannin, and incorporating the flavonoid tannin powder in the mixture of the furfuryl alcohol and the blowing agent, and mixing the mixture so obtained,
adding an acid-based catalyst to the mixture obtained, and mixing,
pouring the mixture thus obtained into the mould, and allowing the components react until the composition is completely foamed in the mould.

14. The process according to claim 13, further comprising the step of adding a predetermined amount of water to the mixture of furfuryl alcohol and blowing agent.

15. The process according to claim 13, wherein the furfuryl alcohol is provided in an amount greater than 20% in weight of the composition, the blowing agent is provided in an amount greater than 5% in weight of the composition, water is provided in to an amount between about 0% and 15% in weight of the composition, the catalyst is provided in an amount less than 16% in weight of the composition, and the tannin is provided an amount between 40% and 45% in weight of the composition.

16. The process according to claim 15, further comprising the step of adding an isocyanate to the aforesaid mixture of components.

17. The process according to claim 16, wherein the isocyanate comprises a polymeric isocyanate (PMDI).

18. The process according to claim 13, wherein the acid-based catalyst comprises p-toluensufonic acid (p-TSA) or trichloroacetic acid.

19. The process according to claim 13, wherein the blowing agent comprises diethyl ether.

20. The tannin-based organic foam material, obtained by the process of claim 17.

* * * * *